May 16, 1933.  P. S. JACKSON  1,909,681
WORKHOLDER FOR MACHINE TOOLS
Original Filed Oct. 12, 1928

Inventor:
Paul S. Jackson,
By Chindell Parker Carlson
Attys.

Patented May 16, 1933

1,909,681

UNITED STATES PATENT OFFICE

PAUL S. JACKSON, OF ROCKFORD, ILLINOIS, ASSIGNOR TO SUNDSTRAND MACHINE TOOL CO., OF ROCKFORD, ILLINOIS, A CORPORATION OF ILLINOIS

WORKHOLDER FOR MACHINE TOOLS

Original application filed October 12, 1928, Serial No. 311,999. Divided and this application filed August 19, 1929. Serial No. 386,826.

The invention relates generally to work holders for machine tools and more particularly to rotatable work holders used for performing a cutting operation or the like upon the periphery of a work piece.

The primary object is to provide such a work holder embodying simple and effective power operated means carried by the body of the work holder for actuating the work engaging jaws to clamp the work in a predetermined position on the holder.

Another object is to provide such a work holder having new and improved means for mounting the jaws on the body of the holder whereby to simplify the operation of replacing the jaws and to insure the accuracy with which the jaws are positioned on the holder.

Another object is to provide a novel jaw-actuating mechanism of the fluid pressure operated type adapted to be mounted in the body of the work holder immediately adjacent the work receiving end thereof so as to be in a readily accessible location when the work holder and its supporting spindle are mounted in any one of the several positions common in machine tools.

Other objects and advantages will become apparent from the following description taken in connection with the accompanying drawing in which.

Figure 1:
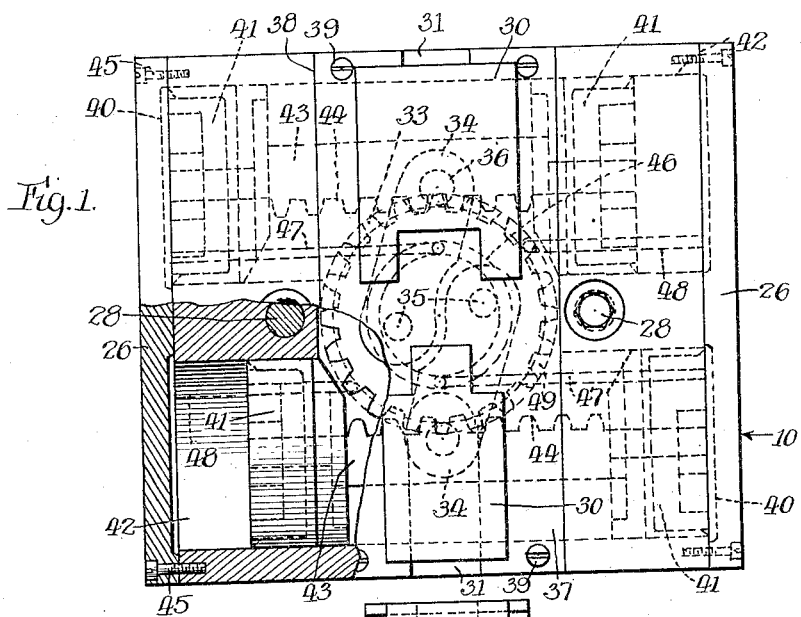
Figure 1 is a plan view of a work holder embodying the preferred form of the invention.

For purposes of disclosure the preferred form of the invention is illustrated in the drawing and will hereinafter be described in detail as constructed for use in a vertical type milling machine, but it is to be understood that this disclosure is not intended as a limitation to the invention to this type of machine tool, it being contemplated that various changes might be made by those skilled in the art to adapt the invention to other types of machines without departing from the spirit and scope of the invention as defined by the appended claims.

The particular form of the invention illustrated herein is adapted for use in a vertical type milling machine of the character shown and claimed in my copending application Serial No. 311,999, filed October 12, 1928, of which this application is a division. In the above mentioned application the work is supported for rotation about a vertical axis so that a peripheral cut of material may be removed therefrom when the vertically positioned cutter and the work are brought into operative relation.

Thus in the drawing of the present case, the work holder is illustrated as comprising a main body 10 mounted on the upper end of a spindle 11 which is rotatably mounted in a saddle 12 for rotation about a vertical axis, the saddle 12 being reciprocable on ways 13 formed on the machine bed 14 so that the work holder may be moved toward and away from an operative position adjacent a processing tool such as a cutter (not shown).

In the form shown the spindle 11 projects downwardly through an aperture 15 (Fig. 2) in the saddle 12 and has an outwardly extending annular flange 16 at its upper end beneath which a ball bearing 17 is positioned. The bearing 17 is of the wedge type having an inner race 18 abutting the lower end of the flange 16 and an outer race 19 supported by an annulus 20 resting on a shoulder formed in the saddle 12. Thus the bearing 17 will take downward thrust impressed on the spindle 11 and a second ball bearing 21 is provided for the spindle mounted thereon adjacent its lower end and arranged to take any upward thrust impressed on the spindle. In the present instance the lower bearing 21 is of the same type as the upper bearing 17 and has an outer race 22 held in fixed position relatively to the saddle 12 by means of an annular flange 23 formed on the saddle and abutting the upper side of the race 22 and a nut 23a screw-threaded into the bottom of the saddle about the spindle 11 and abutting the lower side of the race 22. The lower bearing 21 has an inner race 24 slidably mounted on the spindle 11 and a nut 25 fitted on the spindle so that the inner race 24 may be adjusted upwardly of the spindle to maintain the upper and lower bearings continually in their proper positions.

The main body 10 of the chuck or work holder comprises a box-shaped hollow casting having removable walls 26 at opposite sides thereof and having a circular recess 27 formed in its lower side arranged to fit about the annular flange 16 to position the body 10 definitely and accurately on the spindle. The body 10 is preferably maintained in position on the spindle by a plurality of socket-headed bolts 28 extending downwardly through the body and engaging threaded bores in the flange 16.

To prevent chips and débris from reaching the bearings 17 and 21 an annular guard 29 (Fig. 2) is preferably positioned concentrically of the spindle 11 about the top of the aperture 15 in the saddle so as to project upwardly about the aperture 15 to engage suitable packing secured on the body 10.

For the purpose of securing a work piece in position on the work holder, clamping means is provided mounted in the present instance on the upper side of the body 10. This means preferably comprises a pair of chuck jaws 30 held in position on the work holder and guided for sliding movement toward and away from each other by engagement with a transversely positioned inverted T-slot 31 (Fig. 2) formed in the upper side of the body 10. The chuck jaws 30 are formed at their inner ends so as to engage properly the particular piece of work which is to be done and to center the work accurately on the work holder.

In order that the jaws 30 will invariably clamp a work piece in proper position on the work holder, means is provided to move the two jaws 30 back and forth in timed relation to each other. This means in the preferred form illustrated comprises a rotatable member in the form of a pinion 33 (Fig. 1) rotatably mounted in a horizontal plane within the body 10 and beneath the chuck jaws 30 and operatively connected to both of the jaws by links 34 so that the jaws may be operated by rotative movement of the pinion 33. As shown herein the links 34 are positioned above the pinion 33 and are each connected at one end to the pinion 33 at diametrically opposite points by means of vertical pins 35. The other end of each link 34 is pivotally connected to one of the jaws 30 by a pivot pin 36 projecting upwardly therefrom through the open bottom side of the T-slot 31 and engaging a hole in the jaws 30.

To permit ready removal of the jaws 30 for inspection, replacement or repair, the T-slot 31 in which the jaws are mounted preferably is formed in a removable section 37 positioned in a transverse groove 38 (Fig. 2) formed in the body 10. The section 37 is secured in place by screws 39 passing therethrough and engaging the side walls of the work holder. Thus the section 37 may be removed vertically from the work holder and the jaws 30 will become disengaged from the pins 36. The jaws 30 may then be removed from the T-slot 31 for replacement or repair and the jaw operating mechanism within the body 10 will be partially exposed for inspection.

To reduce to a minimum the time and effort required to produce a finished work piece, power operated means is preferably provided for operating the chuck jaws, and in order that this means may be readily accessible for inspection or repair, it is mounted in the main body 10 of the holder.

This power means as illustrated herein is pressure fluid operated and comprises a plurality of cylinder and piston devices mounted within the body 10 and arranged to oscillate the pinion 33 to clamp or unclamp the jaws. These cylinder and piston devices are of the single acting type and in order that they may be sufficiently small to be mounted within the body 10, two cylinders 40 and pistons 41 are provided for opening the chuck jaws 30 while two cylinders 42 and pistons 41 are provided for clamping them. Thus the two cylinders 40 are mounted in diagonally opposite corners of the body 10, while the cylinders 42 are mounted in the other two corners so as to form two pairs of oppositely acting cylinders, each pair comprising one cylinder 40 and one cylinder 42.

The cylinders 40 and 42 in each pair are axially alined and the pistons 41 therein are connected by a piston rod 43. Thus the two piston rods 43 are disposed in substantially parallel relation and on opposite sides of the pinion 33 and rack teeth 44 (Fig. 1) are formed thereon to engage and rotate the pinion 33 when the piston rods 43 are moved. By supplying pressure fluid to the two cylinders 42 the chuck jaws may be clamped while pressure fluid in the two cylinders 40 will cause the jaws to be unclamped. In order that the cylinders 40 and 42 may be easily accessible, the two side walls 26 of the body 10 are removably secured on the holder by screws 45.

The two cylinders 40 which serve to open the jaws 30 are connected to a common pressure fluid port formed by an annular groove 46 cut in the upper surface of the flanged head 16 of the spindle 11. The groove 46 is closed by the body 10 which rests and is clamped directly on the head 16. The two cylinders 40 are connected to the port 46 by means of two passages 47 formed in the body 10 of the work holder.

Figure 2:
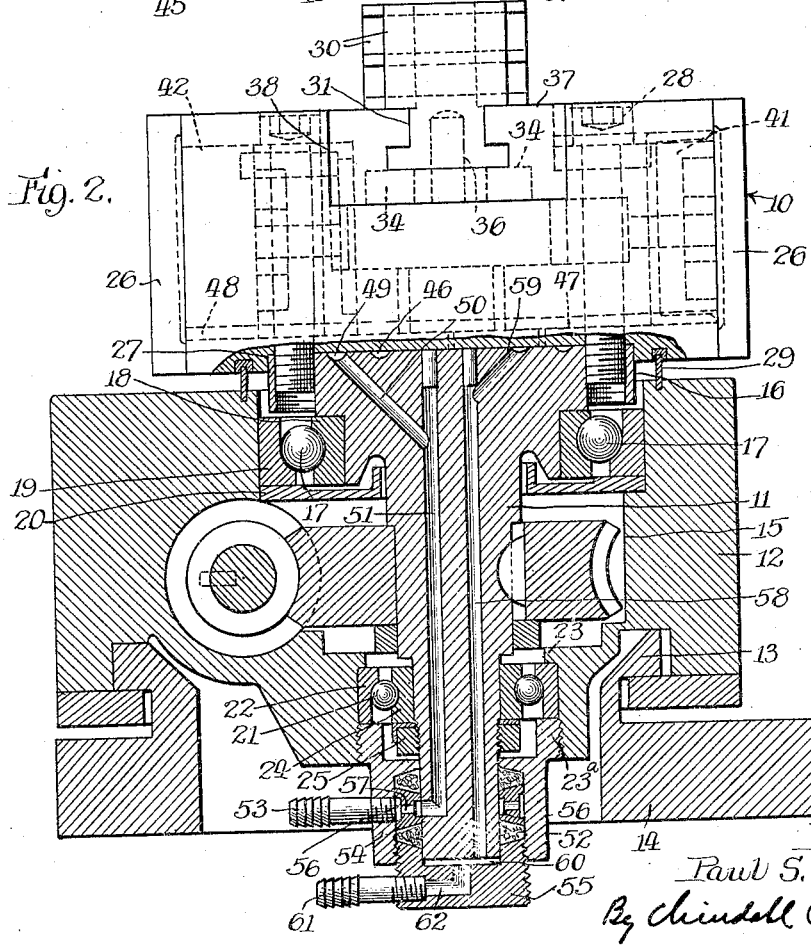
Fig. 2 is a front elevational view of the work holder taken partially in central vertical section.

The other two cylinders 42 which serve to close the jaws 30 are connected by ducts 48 in the work holder to a similar port formed by an annular groove 49 of greater diameter than the groove 46 formed in the head 16 of the spindle. As shown in Fig. 2, the port 49 is connected by means of a duct 50 with the upper end of a longitudinal passage 51 formed in the spindle 11 which passage extends to a point near the bottom end of the spindle 11 and then opens outwardly radially of the spindle. At this point the spindle 11 is surrounded by an annular sleeve 52 depending from the nut 23ª in radially spaced relation to the spindle to provide for a gland connection of an air supply tube 53 with the passage 51.

In the form shown, an annular spacer or collar 54 is placed within the sleeve 52 in register with the end of the passage 51, and the spacer 54 is held in place with suitable packing above and below it by means of a nut 55 screw-threaded into the bottom of the sleeve 52. The spacer 54 has annular grooves 56 formed on its inner and outer sides respectively arranged to register at all times with the tube 53 and the bore 51 and these grooves 56 are connected by a plurality of radial holes 57 in the spacer.

Thus pressure fluid may be supplied to the cylinders 42 to close the jaws 30 in any rotative position of the work holder. This result is attained also in the case of the cylinders 40 by means of a longitudinal passage 58 formed in the spindle 11 and connected to the chamber 46 by a duct 59, said longitudinal passage extending through the bottom of the spindle 11 into a chamber 60 formed in the packing nut 55. Pressure fluid is supplied to this chamber by a tube 61 screw-threaded into a hole 62 formed in the nut 55 and opening into the chamber 60.

Suitable pressure fluid supply means of a well-known character together with valve controls therefor may be connected to the tubes 53 and 61 so that pressure fluid may be supplied at the will of the operator to the cylinders 40 or 42 to open or close the jaws 30. The valve means used is, of course, arranged so that the tube for one set of cylinders may act as an exhaust passage when pressure fluid is turned into the other pair of cylinders.

Since the work receiving end of the work holder is in most cases positioned so as to be accessible for loading and unloading it will be apparent that the invention provides a work holder in which the power-operating mechanism is readily accessible for inspection or repair.

Furthermore, it will be seen that the mounting of the jaws renders them easily replaceable.

I claim as my invention:

1. A work holder for machine tools comprising, in combination, a body having a transverse groove formed therein, a guide section removably secured in said groove and having an outwardly opening T-slot therein, a pair of chuck jaws slidably mounted in said T-slot, operating means for said jaws mounted in said body and means connecting said operating means to said jaws when said section carrying the jaws is secured in said groove, said connecting means being disengageable by removal of said section and said jaws from said body.

2. A work holder for machine tools comprising, in combination, a body having guide means therein, a pair of chuck jaws engaging said guide means, and means for moving said jaws toward and from each other in timed relation so as to clamp the work in a predetermined position, said means including a member rotatably mounted on said body, a pair of links each having one end pivotally connected to one of said jaws and having their other ends pivoted on said rotatable member, whereby said jaws may be moved in timed relation to each other by rotation of said member relatively to said body.

3. A work holder for machine tools comprising, in combination, a rotatably mounted body having guide means therein, a pair of chuck jaws engaging said guide means, a member mounted on said body for rotative movement relatively thereto, a pair of links, one connecting each of said jaws with said member, and power operated means mounted on and for rotation with said body connected to said member and operable to rotate said member relatively to said body.

4. A work holder for machine tools comprising, in combination, a body, a pair of movably mounted chuck jaws thereon, and means for clamping and unclamping said jaws comprising a pinion mounted in said body, a pair of links one connecting each jaw with said pinion eccentrically thereof, a pair of axially alined and spaced cylinders mounted in said body, pistons in said cylinders, a common piston rod connecting the two pistons, and rack teeth carried on said piston rod between said cylinders and engaging said pinion whereby said pinion may be rotated by operation of said pistons.

5. A work holder for machine tools comprising, in combination, a body having movably mounted chuck jaws thereon, a pinion mounted in said body for rotation about an axis perpendicular to the plane of movement of said jaws, a plurality of links, one link connecting each of said jaws with said pinion, a piston and cylinder device mounted on said body, and a rack engaging said pinion and movable by said device to operate said jaws.

6. A work holder for machine tools comprising, in combination, a body, a pair of opposed chuck jaws movably mounted thereon, and means for operating said jaws, said means comprising a first pair of piston and cylinder devices for moving the jaws in one direction, the devices of said pair being mounted on opposite sides of the center of the work holder, a second pair of piston and cylinder devices for moving the jaws in the other direction, the devices of said pair being mounted on opposite sides of the center of the work holder, and means operatively connecting the pistons with said jaws.

7. A work holder for machine tools comprising, in combination, a body having a transverse groove formed therein, a guide section removably secured in said groove and having an outwardly opening T-slot therein, a pair of chuck jaws slidably mounted in said T-slot, and operating means for said jaws mounted in said body, said operating means including a pair of pins movable longitudinally of said groove and projecting outwardly of said groove in a direction perpendicular to the path of movement of said jaws and means for reciprocating said pins, said jaws each having a recess formed therein adapted to be engaged with one of said pins as said guide section is moved into position in said groove whereby to form a readily detachable connection between said operating means and said jaws.

8. A work holder for machine tools comprising, in combination, a body, chuck jaws movably mounted thereon, a first cylinder mounted on said body and having one end closed, a piston in said cylinder, a piston rod connected to one end of the piston and extending out of the other end of the cylinder, means connecting said piston rod to said jaws, means for supplying pressure fluid to the closed end of said cylinder to actuate said jaws and clamp a work piece therebetween, a second cylinder mounted on said body and having one end closed, a piston in said second cylinder, a rod connected to said piston and extending out of the other end thereof, means connecting said rod to said jaws, and means for supplying pressure fluid to the closed end of said second cylinder for actuating said piston and moving said jaws to release a work piece.

9. A work holder for machine tools comprising, in combination, a body having movably mounted chuck jaws thereon, a member mounted in said body for rotation about an axis perpendicular to the plane of movement of said jaws, a plurality of links, one link connecting each of said jaws eccentrically with said member, a piston and cylinder device mounted on said body, and means connected to said member and movable by said device to operate said jaws.

10. A work holder for machine tools comprising, in combination, a body, chuck jaws movably mounted thereon, a pair of cylinders mounted on said body in opposed relation and having closed outer ends, pistons in said cylinders, means connecting said pistons to said jaws, a second pair of cylinders mounted on said body in opposed relation and having closed outer ends, pistons in said cylinders, means connecting said last mentioned pistons to said jaws, means for supplying pressure fluid to the outer ends of one of each of said pairs of cylinders for closing the jaws, and means for supplying pressure fluid to the outer ends of the other of said cylinders for opening the jaws.

In testimony whereof, I have hereunto affixed my signature.

PAUL S. JACKSON.